May 22, 1934. A. LYSHOLM 1,959,795
GAS TURBINE SYSTEM FOR VARYING LOADS
Filed Oct. 21, 1932  3 Sheets-Sheet 1
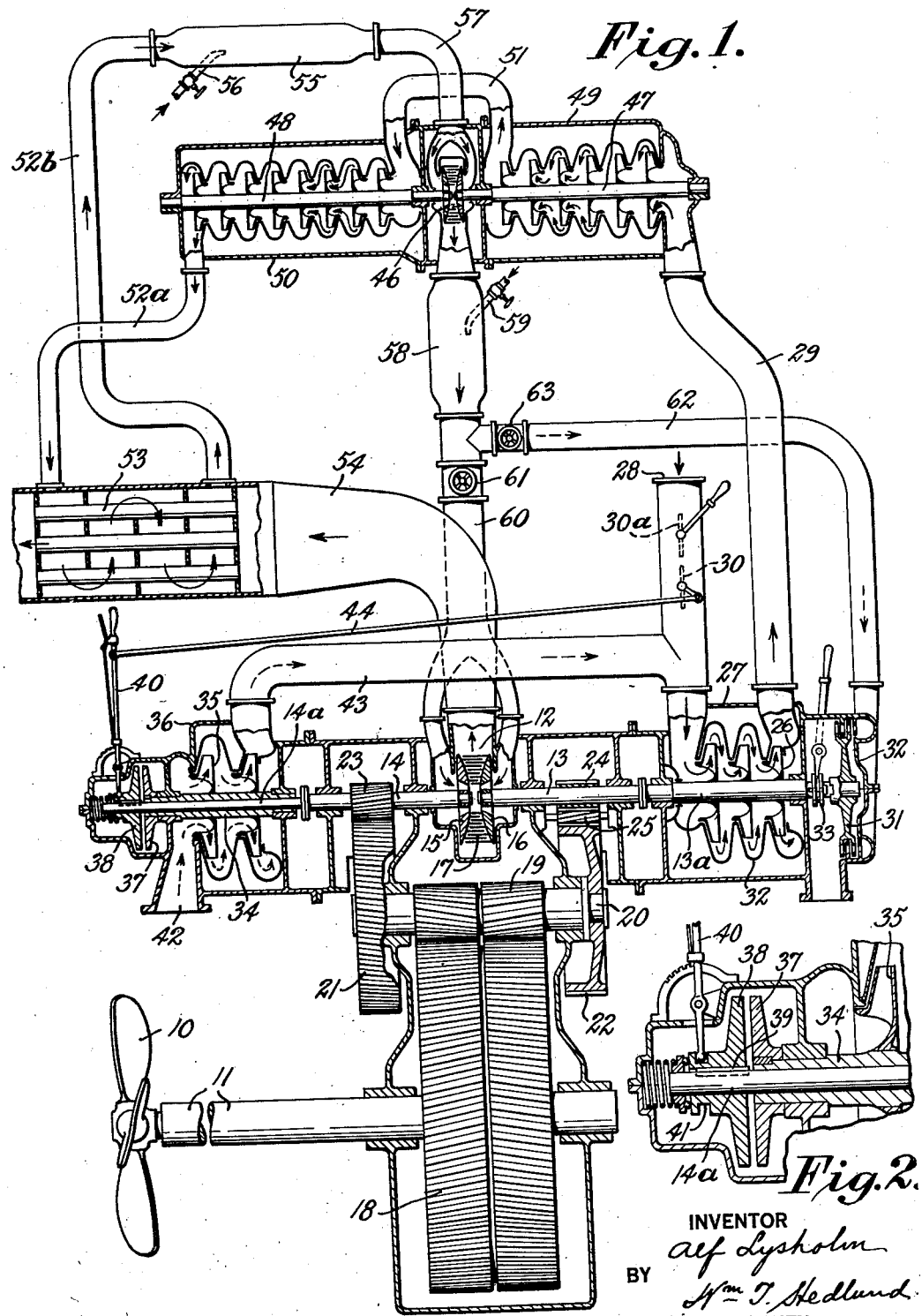

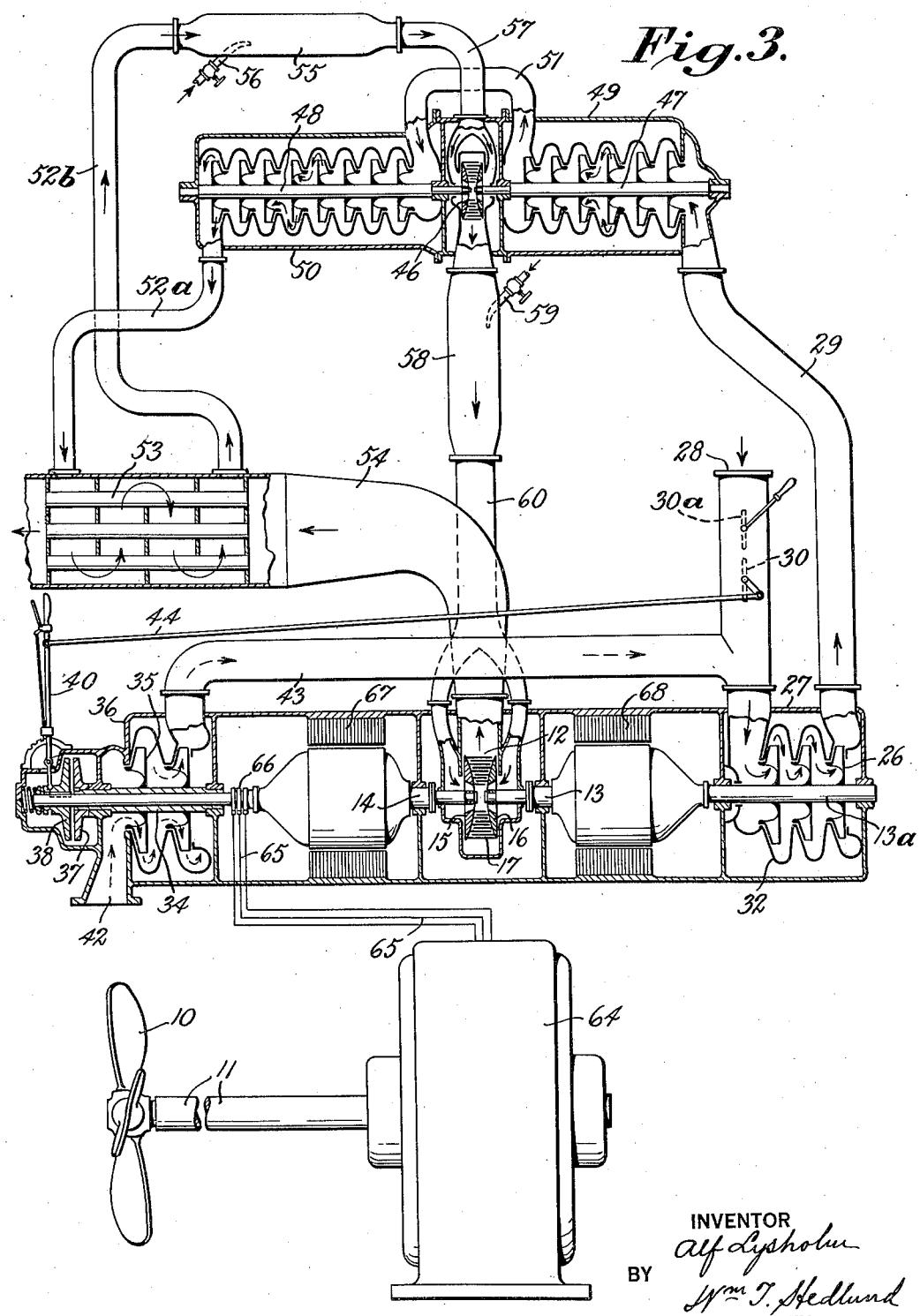

Patented May 22, 1934

1,959,795

UNITED STATES PATENT OFFICE 1,959,795

GAS TURBINE SYSTEM FOR VARYING LOAD

Alf Lysholm, Stockholm, Sweden, assignor to Aktiebolaget Milo, Stockholm, Sweden, a joint-stock company of Sweden Application October 21, 1932, Serial No. 638,980
In Germany October 24, 1931

19 Claims. (Cl. 60—41)

The present invention relates to gas turbine plants or systems for varying load and has particular reference to the employment of such plants for the propulsion of ships.

Broadly speaking, a principal object of the invention is to provide a gas turbine plant or system which will operate with a high efficiency not only at the normal load or speed but also under conditions when the load or speed are under or above their normal values.

The manner in which the above and other and more specific objects of the invention are attained will best be understood from a consideration of the following description of suitable apparatus for carrying the invention into effect, taken in conjunction with the accompanying drawings illustrative thereof, in which Fig. 1 is a more or less diagrammatic plan view, partly in section, of a gas turbine system providing a geared turbine drive for a ship's propeller;

Fig. 2 is a view on a larger scale of part of the apparatus shown in Fig. 1;

Fig. 3 is a view similar to Fig. 1 showing a gas turbine system adapted for electric drive of the propeller shaft.

Figure 4:
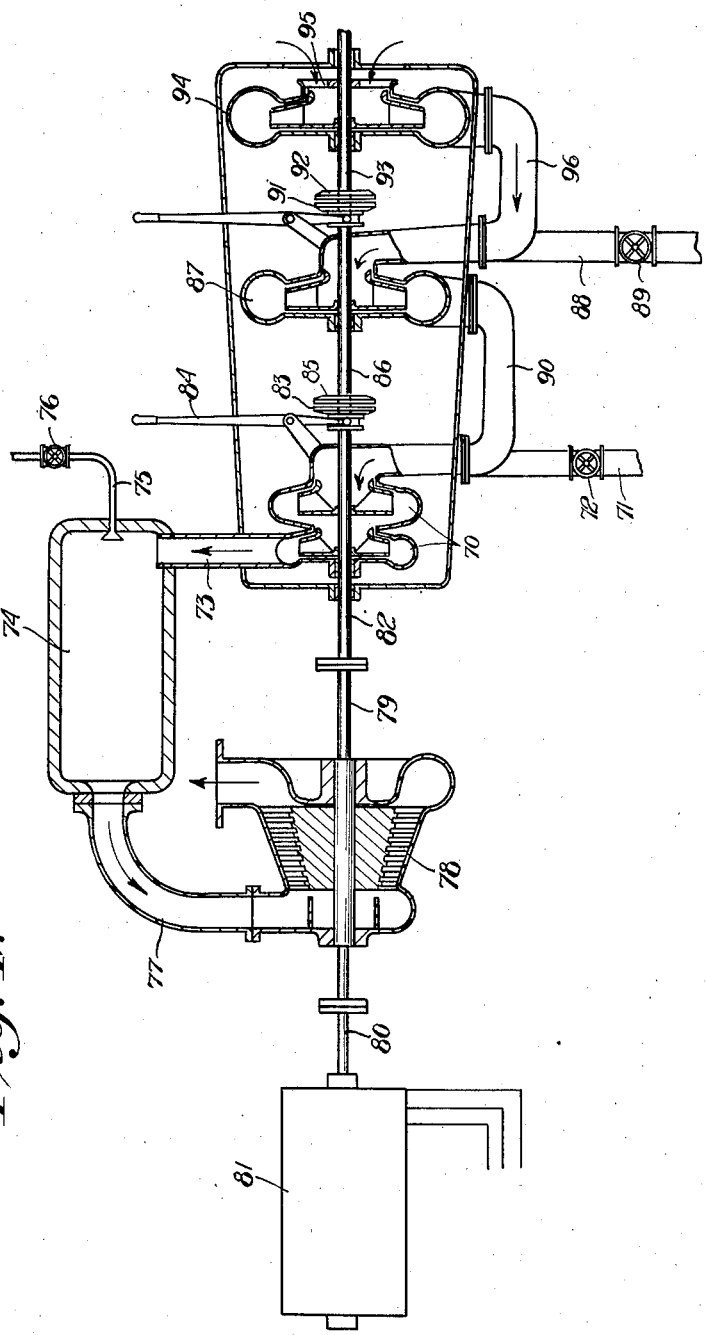
Fig. 4 is a view similar to Fig. 1 showing schematically another embodiment of a gas turbine plant for stationary or marine use.

Referring now more particularly to Fig. 1, reference character 10 indicates the propeller of a ship, mounted on propeller shaft 11. Shaft 11 is driven through suitable reduction gearing by a gas turbine indicated generally at 12, and comprising two aligned shafts 13 and 14, which shafts carry the rotors 15 and 16 respectively. The rotors each carry a plurality of concentric rows of blades 17 forming the blade system of the turbine, the blades being arranged so that flow of motive fluid through the turbine causes the shafts 13 and 14 to rotate in opposite directions. Turbine 12 may be said to be of the radial flow double rotation type.

The reduction gearing for driving the propeller shaft 11 comprises a slow speed gear 18 advantageously of the herringbone type, with which meshes pinion 19 mounted on the intermediate shaft 20. Shaft 20 carries two gears 21 and 22. Gear 21 meshes with pinion 23 on shaft 14 and gear 22 is connected with pinion 24 on shaft 13 by way of the idler gear 25, so that the oppositely rotating shafts 13 and 14 will transmit motion in the same direction to the gears 21 and 22 on shaft 20. One or both of pinions 23 or 24 may be advantageously secured to its shaft by means of a releasable coupling such as a dog or friction clutch or the like, for a purpose which will be explained later.

Shaft 13 is extended to provide the rotor shaft 13a, which may be considered as a part of shaft 13, of the rotor 26 of an air compressor 27. Compressor 27 is of the multiple stage centrifugal type through which air is forced in the direction indicated by the arrows from the inlet conduit 28 open to the atmosphere to the discharge conduit 29. Inlet conduit 28, open to the atmosphere, is advantageously provided with two control valves 30 and 30a, valve 30 being connected to mechanism to be hereinafter described.

Overhung on the end of shaft 13a remote from rotor 16 is the rotor 31 of a reversing turbine 32, said rotor being advantageously disconnectable through the medium of a suitable clutch such as the dog clutch diagrammatically illustrated at 33.

Shaft 14 is extended at 14a (see Fig. 2) and around the outer end of the shaft is the hollow sleeve 34 forming the shaft part of the rotor 35 of compressor 36.

Compressor 36 is advantageously of the same type as compressor 32, and the rotor 35 is driven from shaft part 14a through the medium of a releasable coupling which should be of a type permitting the rotor to be coupled to the driving shaft while the latter is in operation. In the arrangement illustrated, the coupling is of the friction clutch type comprising a clutch plate 37 fixed on the driven sleeve 34 and a cooperating clutch plate 38 slidably mounted on shaft part 14a but constrained to rotate therewith due to the key 39. Engagement and disengagement of the clutch plates is controlled by movement of the clutch lever 40, one end of which engages a suitable groove 41 in the hub of plate 38.

Air is admitted to compressor 36 through the inlet 42 open to atmosphere and the outlet of this compressor is connected by means of conduit 43 to the inlet end of compressor 32, with which conduit 28 is also in communication. Lever 40 may advantageously be connected to valve 30 by means of a suitable link as indicated at 44 so that when the clutch plates 37, 38 are engaged, valve 30 is closed.

A second radial flow double rotation turbine is shown at 46, comprising oppositely rotating shafts 47 and 48 which carry the rotor elements of compressors 49 and 50 respectively. The inlet of compressor 49 is connected to conduit 29 and the outlet of the compressor is connected by means of conduit 51 to the inlet of compressor 50. Compressor 50 discharges air through conduit 52a to a surface type heat exchanger 53. Exhaust gases from turbine 12 are conducted to the heat exchanger through conduit 54. The air outlet of heat exchanger 53 is connected by conduit 52b to a combustion chamber 55 to which fuel is admitted through the valve controlled supply pipe 56. The outlet of the combustion chamber is connected to the inlet of turbine 46 by conduit 57 and the outlet of the turbine is connected to the inlet of a second combustion chamber 58 to which fuel is admitted through the valve controlled supply pipe 59. The outlet of combustion chamber 58 is connected to the inlet of turbine 12 by conduit 60 in which is located valve 61, and a branch conduit 62, controlled by valve 63, connects combustion chamber 58 with the inlet of the reversing turbine 32.

The operation of the system is as follows, it being assumed that it is desired to drive the ship at normal forward cruising speed. The clutch connecting compressor 36 and shaft 14 is disengaged, as shown, and valves 30 and 30a are open. Coupling 33 is also disengaged. Valve 61 is open and valve 63 is closed. Air is drawn into compressor 27 from conduit 28 and passes in the direction indicated by the arrows to the discharge conduit 29, which conducts it at elevated pressure to compressor 49, in which the air is further compressed. The further compressed air passes by way of conduit 51 to compressor 50 in which it is compressed to its final pressure and delivered, through conduits 52a, 52b and heat exchanger 53, to the combustion chamber 55, where combustion of fuel with the compressed air takes place to provide a gaseous motive fluid at high pressure for operating the turbine 46. It will be observed that the several compressors are serially connected and that with the system operating as described the compressor 27 constitutes the low pressure compressor of the system.

The motive fluid as delivered from combustion chamber 55 contains excess air, and the motive fluid which is exhausted from turbine 46 at reduced pressure and temperature is reheated by the combustion therewith of additional fuel supplied to combustion chamber 58. The reheated motive fluid is delivered through conduit 60 to turbine 12, from which it is exhausted through conduit 54 to the heat exchanger 53, which operates as an air preheater for recovering for use a part of the heat of the exhaust gases which would otherwise be lost.

If the system is to operate at a rate giving less power than that required for normal cruising speed, the amount of air compressed is reduced by partially closing valve 30a. Obviously, other valve arrangements may be employed to secure the desired control.

If it is desired to reverse the direction of rotation of the propeller shaft 11, valve 61 is closed, the reversing turbine 32 is coupled to shaft 13a and valve 63 is opened.

If it is now assumed that forced or overload operation of the system is desired, with the apparatus arranged for forward drive, the compressor 36 is coupled to shaft 14 and the air valve 30 in conduit 28 is closed. Compressor 36, taking air through inlet 42, now becomes the low pressure compressor of the system, delivering air at elevated pressure to compressor 27, which now acts as an intermediate stage compressor. As a result of the added stage of compression represented by the inclusion of compressor 36 in the system, air is delivered to combustion chamber 55 at augmented pressure, resulting in a higher pressure of the motive fluid supplied to turbine 46. Also, the compressor 36 preferably has a capacity such that it is able to deliver to compressor 27 the same volume of air, at elevated pressure, that compressor 27 draws in at low pressure through conduit 28 when operating as the low pressure compressor. Thus the same volume of air is delivered to the combustion chamber 55 when compressor 36 is the low pressure compressor as when compressor 27 is the low pressure compressor, but in the former case, due to the greater density of the air because of its higher pressure, more fuel may be burned in the combustion chamber. This results in an increase in the total heat energy available in the motive fluid as well as increase in pressure thereof, and consequently the system is capable of developing greater power.

Turning now to Fig. 3 there is illustrated a gas turbine system suitable for electric propulsion. In this arrangement the propeller shaft 11 is driven by a motor 64 which is connected by means of any appropriate electrical wiring system, indicated at 65, to slip rings 66 on shaft 14 of turbine 12. Shaft 14 carries the rotor of an electric generator part 67 and the oppositely rotating shaft 13 carries the rotor of a similar generator part 68 of a generator delivering current to the slip rings 66. In the present embodiment, the arrangement of compressors, turbines, combustion chambers and heat exchanger with respect to flow of air and gases is the same as that shown in Fig. 1 and the description thereof need not be repeated. Also the operation is the same with respect to the compression of air under different conditions of load on the system. Due to the fact that the motor 64 may be reversed through the medium of known electrical controls, without reversing the turbine 12, the reversing turbine 32 employed in the system shown in Fig. 1 is not required, and the conduit 62 and valves 61 and 63 are also not required.

The gas turbine plant diagrammatically shown in Fig. 4 has two disconnectable compressors. When the plant is working at normal load the air is sucked in by the compressor 70 through a conduit 71 controlled by a valve 72. The compressed air is delivered through the conduit 73 to the combustion chamber 74 in which fuel is injected through a pipe 75 controlled by a valve 76. The conduit 73 may also lead the air through a regenerator heated by the discharge gases from the gas turbine employed in the plant, in the manner indicated in Fig. 1.

From the combustion chamber 74 the gases are delivered through a conduit 77 to the gas turbine 78 which in this case is of the axial flow type.

The shaft 79 of the turbine 78 is permanently connected with a shaft 80 of a generator 81 on the one hand and on the other hand with the shaft 82 of the compressor 70. On this shaft 82 there is arranged one member 83 of a coupling, such as a claw or friction coupling, said member 83 being actuated by means of a handle 84 to bring the same into or out of contact with the second coupling member 85 arranged on the shaft 86 of another compressor 87.

When the plant works under normal conditions the coupling members 83 and 85 are not in engagement with each other but when the load becomes higher the said coupling members are thrown into engagement and the compressor 87 begins to suck in air through the pipe 88 which is controlled by a valve 89 which is now open. The valve 72 is closed and the air compressed by the compressor 87 thus is delivered through the conduit 90 to the compressor 70 to be further compressed therein. The fuel injection is increased and the turbine will accordingly be able to produce more power.

If the load is increased still more the coupling member 91 is thrown into engagement with the coupling member 92 arranged on the shaft 93 of still another compressor 94 which upon rotation sucks in air through the inlet 95 and delivers the compressed air through conduit 96 to the compressor 87 for further compression. In this case the valve 89 is closed and the compressors 94, 87 and 70 are then low, medium and high pressure compressors respectively. Of course, either or all of the compressors 70, 87 and 94 may be constructed as multi stage compressors.

Obviously not only the compressor 70 but also compressor 87 may be in operation at normal load, the compressor 94 being added at higher load and both compressors 87 and 94 being uncoupled at a load lower than normal load.

While in its broader aspects the invention is not limited to systems of the specific character illustrated, it is preferred to employ radial flow double rotation turbines since this type of turbine contributes important advantages of compactness and efficiency of operation and the serial arrangement of compressors and turbines, with the turbine developing useful power operating as the low pressure stage is important in obtaining the highest possible thermal efficiency of the system. Furthermore, it is desirable to drive the compressing means which is disconnectable from the system by means of the low pressure turbine.

Other arrangements of turbines and compressors within the scope of the invention will be apparent to those skilled in the art and it will also be evident that the principles of the invention may be employed to advantage in gas turbine systems for certain uses outside of the field of ship propulsion. Broadly speaking the invention may be advantageously employed in each case where there are varying load conditions and where marked peak loads occur.

What I claim is:—

1. In a gas turbine system, power producing means including a gas turbine, means driven by said gas turbine for developing useful power, a compressor driven by said power producing means for compressing air, means for heating the compressed air to provide motive fluid for said power producing means, said compressor being permanently driven by said power producing means during the operation of the system and having a normal full load capacity for compressing a quantity of air appropriate to meet the requirements of the system at normal load, means for increasing the air compressing capacity of the system to a value permitting forced operation of the system comprising a second compressor arranged to be driven by said power producing means, and means comprising a releasable coupling permitting said second compressor to remain at rest when the system is operating at normal load and to be driven by said power producing means to compress air for the system when the system is operating with a load higher than normal load.

2. In a gas turbine system, power producing means including a gas turbine, means driven by said gas turbine for developing useful power, a compressor driven by said power producing means for compressing air, means for heating the compressed air to provide motive fluid for said power producing means, said compressor being permanently driven by said power producing means during the operation of the system and having a normal full load capacity for compressing a quantity of air appropriate to meet the requirements of the system at normal load, means for increasing the air compressing capacity of the system to a value permitting forced operation of the system comprising a second compressor arranged to be driven by said power producing means, and means comprising a releasable coupling permitting said second compressor to remain at rest when the system is operating at normal load and to be coupled in series before said first named compressor to operate as a low pressure compressor delivering air to said first named compressor when the system is operating with a load higher than normal load.

3. In a gas turbine system, power producing means including at least two gas turbines, means driven by one of said gas turbines for developing useful power, a compressor driven by said power producing means for compressing air, means for heating the compressed air to provide motive fluid for said power producing means, said compressor being permanently driven by said power producing means during the operation of the system and having a normal full load capacity for compressing a quantity of air appropriate to meet the requirements of the system at normal load, means for increasing the air compressing capacity of the system to a value permitting forced operation of the system comprising a second compressor arranged to be driven by the gas turbine driving said useful power developing means, and means comprising a releasable coupling permitting said second compressor to remain at rest when the system is operating at normal load and to be driven by said gas turbine to compress air for the system when the system is operating with a load higher than normal load.

4. In a ship, a propeller shaft, a gas turbine system for propelling the ship, said system comprising power producing means including a gas turbine producing useful power for driving said shaft and compressor means driven by said power producing means for compressing air, means for heating the compressed air to provide motive fluid for said power producing means, said compressor means having a normal full load capacity for compressing a quantity of air appropriate to meet the requirements of the system for propulsion of the ship at normal cruising speed, means for increasing the air compressing capacity of the system to a value permitting forced operation of the system for propulsion of the ship at greater than normal cruising speed comprising a compressor arranged to be driven by said power producing means and means for driving said compressor comprising a releasable coupling permitting said compressor to remain at rest when the system is operating to propel the ship at normal cruising speed.

5. In a ship, a propeller shaft, a gas turbine system for propelling the ship, said system comprising power producing means including a gas turbine producing useful power for driving said ship, compressor means driven by said power producing means for compressing air, means for heating the compressed air to provide motive fluid for said power producing means, said compressor means having a normal full load capacity for compressing from substantially atmospheric pressure a quantity of air appropriate to meet the requirements of the system for propulsion of the ship at normal cruising speed, means for increasing the air compressing capacity of the system to a value permitting forced operation of the system for propulsion of the ship at greater than normal cruising speed comprising a compressor for delivering air at elevated pressure to the inlet of said compressor means, said compressor being arranged to be driven by said power producing means and means for driving said compressor comprising a releasable coupling permitting said compressor to remain at rest when the system is operating to propel the ship at normal cruising speed.

6. In a ship, a propeller shaft, a gas turbine system for propelling the ship, said system comprising power producing means including a gas turbine producing useful power for driving said ship, compressor means driven by said power producing means for compressing air, means for heating the compressed air to provide motive fluid for said power producing means, said compressor means having a normal full load capacity for compressing a quantity of air appropriate to meet the requirements of the system for propulsion of the ship at normal cruising speed, means for increasing the air compressing capacity of the system to a value permitting forced operation of the system for propulsion of the ship at greater than normal cruising speed comprising a compressor arranged to be driven by said power producing means and means for driving said compressor comprising a clutch releasable to permit said compressor to remain at rest when the system is operating to propel the ship at normal cruising speed and engageable with said power producing means in operation whereby to permit the air compressing capacity of the system to be increased without interruption of the operation thereof.

7. In a ship, a propeller shaft, a gas turbine system for propelling the ship, said system comprising power producing means including a gas turbine producing useful power for driving said shaft and compressor means driven by said power producing means for compressing air, means for heating the compressed air to provide motive fluid for said power producing means, said compressor means having a normal full load capacity for compressing a quantity of air appropriate to meet the requirements of the system for propulsion of the ship at normal cruising speed and comprising a plurality of compressors connected in series with respect to flow of air therethrough and including a first low pressure compressor having an inlet opening for air at substantially atmospheric pressure, means for increasing the air compressing capacity of the system to a value permitting forced operation of the system for propulsion of the ship at greater than normal cruising speed comprising a second low pressure compressor arranged to be driven by said power producing means, said second low pressure compressor having an inlet for air at substantially atmospheric pressure, a conduit for conducting air at elevated pressure from said second low pressure compressor to the inlet end of said first low pressure compressor, means for driving said second low pressure compressor comprising a releasable coupling for permitting said second low pressure compressor to remain at rest when the system is operating to propel the ship at normal cruising speed and means for closing the inlet opening which admits air at atmospheric pressure to said first low pressure compressor when said second low pressure compressor is in operation.

8. In a ship, a propeller shaft, a gas turbine system for propelling the ship, said system comprising power producing means including a gas turbine producing useful power for driving said shaft and compressor means driven by said power producing means for compressing air, means for heating the compressed air to provide motive fluid for said power producing means, said compressor means having a normal full load capacity for compressing a quantity of air appropriate to meet the requirements of the system for propulsion of the ship at normal cruising speed and comprising a plurality of compressors connected in series with respect to flow of air therethrough and including a first low pressure compressor having an inlet opening for air at substantially atmospheric pressure, means for increasing the air compressing capacity of the system to a value permitting forced operation of the system for propulsion of the ship at greater than normal cruising speed comprising a second low pressure compressor arranged to be driven by said power producing means, said second low pressure compressor having an inlet for air at substantially atmospheric pressure and having a capacity such as to deliver in normal operation a volume of air at elevated pressure at least as great as the volume of uncompressed air entering said first low pressure compressor when the system is operating at normal full load, a conduit for conducting air at elevated pressure from said second low pressure compressor to the inlet end of said first low pressure compressor, means for driving said second low pressure compressor comprising a releasable coupling for permitting said second low pressure compressor to remain at rest when the system is operating to propel the ship at normal cruising speed and means for closing the inlet opening which admits air at atmospheric pressure to said first low pressure compressor when the second mentioned low pressure compressor is in operation.

9. In a ship, a propeller shaft, a gas turbine system for propelling the ship, said system comprising a plurality of gas turbines including a turbine producing useful power for driving said shaft, compressor means driven by said turbines comprising a plurality of compressors serially connected with respect to air flow for compressing air, means for heating the compressed air to provide motive fluid for said turbines and including a first low pressure compressor having an inlet opening for air at substantially atmospheric pressure, said compressor means having a normal full load capacity for compressing a quantity of air appropriate to meet the requirements of the system for propulsion of the ship at normal cruising speed, means for increasing the air compressing capacity of the system to a value permitting forced operation of the system for propulsion of the ship at greater than normal cruising speed comprising a second low pressure compressor for delivering air at elevated pressure to the inlet end of the first mentioned low pressure compressor, means for driving said second low pressure compressor from the turbine producing useful power comprising a releasable coupling permitting said second low pressure compressor to remain at rest when the system is operating to propel the ship at normal cruising speed, and means for closing the inlet opening for air at atmospheric pressure of said first low pressure compressor when said second low pressure compressor is in operation.

10. In a ship, a propeller shaft, a gas turbine system for propelling the ship, said system comprising a plurality of gas turbines including a double rotation turbine having two oppositely rotating shafts and producing useful power for driving said propeller shaft, compressor means driven by said turbines comprising a plurality of compressors serially connected with respect to air flow and for compressing air, means for heating the compressed air to provide motive fluid for said power producing means and including a first low pressure compressor driven by one of the shafts of said double rotation turbine and having an inlet opening for air at substantially atmospheric pressure, said compressor means having a normal full load capacity for compressing a quantity of air appropriate for meeting the requirements of the system for propulsion of the ship at normal cruising speed, means for increasing the air compressing capacity of the system to a value permitting forced operation of the system for propulsion of the ship at greater than normal cruising speed comprising a second low pressure compressor adapted to be driven by the other of the shafts of said double rotation turbine for delivering air at elevated pressure to the inlet end of said first low pressure compressor, means for driving said second low pressure compressor comprising a releasable coupling permitting said second low pressure compressor to remain at rest when the system is operating to propel the ship at normal cruising speed, and means for closing the inlet opening for air at atmospheric pressure of said first low pressure compressor when said second low pressure compressor is in operation.

11. In a ship, a propeller shaft, a gas turbine system for propelling the ship comprising a plurality of gas turbines including a turbine producing useful power for driving said shaft, said turbines being serially connected with respect to flow of motive fluid through the system and the low pressure expansion stage of the stem comprising the turbine for producing useful power, compressor means driven by said turbines comprising a plurality of compressors serially connected with respect to air flow therethrough for compressing air, means for heating the compressed air to provide motive fluid for said turbines, said compressor means having a normal full load capacity for compressing a quantity of air appropriate to meet the requirements of the system for propulsion of the ship at normal cruising speed and including a first low pressure compressor having an inlet for air at substantially atmospheric pressure, means for increasing the air compressing capacity of the system to a value permitting forced operation of the system for propulsion of the ship at greater than normal cruising speed comprising a second low pressure compressor having an inlet for air at substantially atmospheric pressure, a conduit for conducting air at elevated pressure from said second low pressure compressor to the inlet of said first low pressure compressor, means for driving said second low pressure compressor from the turbine for producing useful power comprising a releasable coupling permitting said compressor to remain at rest when the system is operating to propel the ship at normal cruising speed, and means for closing said inlet opening for atmospheric air of said first low pressure compressor when said second low pressure compressor is in operation.

12. In a ship, a propeller shaft, a gas turbine system for propelling the ship comprising a plurality of gas turbines including a double rotation turbine having two oppositely rotating shafts and producing useful power for driving said shaft, said turbines being serially connected with respect to flow of motive fluid through the system and the low pressure expansion stage of the system comprising the turbine for producing useful power, compressor means driven by said turbines comprising a plurality of compressors serially connected with respect to air flow therethrough for compressing air, means for heating the compressed air to provide motive fluid for said turbines, said compressor means having a normal full load capacity for compressing a quantity of air appropriate to meet the requirements of the system for propulsion of the ship at normal cruising speed and including a first low pressure compressor driven by one of the shafts of said double rotation turbine and having an inlet for air at substantially atmospheric pressure, means for increasing the air compressing capacity of the system to a value permitting forced operation of the system for propulsion of the ship at greater than normal cruising speed comprising a second low pressure compressor adapted to be driven by the other of the shafts of said double rotation turbine and having an inlet for air at substantially atmospheric pressure, a conduit for conducting air at elevated pressure from said second low pressure compressor to the inlet of said first low pressure compressor, means for driving said second low pressure compressor comprising a releasable coupling permitting said compressor to remain at rest when the system is operating to propel the ship at normal cruising speed, and means for closing said inlet opening for atmospheric air of said first low pressure compressor when said second low pressure compressor is in operation.

13. In apparatus of the character described a gas turbine of the radial flow double rotation type having shafts adapted to rotate in opposite directions, a first compressor driven by one of said shafts, said compressor having an inlet opening for admission of air at substantially atmospheric pressure and an outlet for delivering air at elevated pressure to be utilized as a constituent of the motive fluid for said turbine, a second compressor adapted to be driven by the other of said shafts, said second compressor having an inlet for air at substantially atmospheric pressure, a conduit connecting the outlet of said second compressor with the inlet of said first compressor, means for closing the inlet opening for atmospheric air of said first compressor, a releasable coupling between said second compressor and said other of said shafts, said coupling permitting said second compressor to remain at rest when said turbine is in operation and being capable of being engaged when said turbine is in operation, and means for taking useful power from said shafts.

14. In apparatus of the character described a gas turbine of the radial flow double rotation type having shafts adapted to rotate in opposite directions, a first compressor driven by one of said shafts, said compressor having an inlet opening for admission of air at substantially atmospheric pressure and an outlet for delivering air at elevated pressure to be utilized as a constituent of the motive fluid for said turbine, a second compressor adapted to be driven by the other of said shafts, said second compressor having an inlet for air at substantially atmospheric pressure, a conduit connecting the outlet of said second compressor with the inlet of said first compressor, a releasable coupling between the second compressor and said other of said shafts, said coupling permitting said second compressor to remain at rest when said turbine is in operation and being capable of being engaged when said turbine is in operation, means operatively connected with said coupling for closing the inlet opening for atmospheric air of said first compressor when said coupling is engaged, and means for taking useful power from said shafts.

15. In a gas turbine system, power producing means including a gas turbine, means driven by said gas turbine for developing useful power, a first compressor permanently driven by said power producing means during the operation of the system and having an inlet opening for admission of air at substantially atmospheric pressure and an outlet for delivering air at elevated pressure to be utilized as a constituent of the motive fluid for said power producing means, means for increasing the air compressing capacity of the system to a value permitting forced operation of the system comprising two additional compressors adapted to be driven by said power producing means and coupling means permitting at least one of said additional compressors to remain at rest when the system is operating at normal load and to be driven by said power producing means to compress air for the system when the system is operating with a load higher than normal load.

16. In a gas turbine system, power producing means including a gas turbine, means driven by said gas turbine for developing useful power, a first compressor permanently driven by said power producing means during the operation of the system and having an inlet opening for admission of air at substantially atmospheric pressure and an outlet for delivering air at elevated pressure to be utilized as a constituent of the motive fluid for said power producing means, a second compressor adapted to be driven by said power producing means, said second compressor having an inlet for air at substantially atmospheric pressure, a conduit connecting the outlet of said second compressor with the inlet of said first compressor, a third compressor adapted to be driven by said power producing means, said third compressor having an inlet for air at substantially atmospheric pressure, a conduit connecting the outlet of said third compressor with the inlet of said second compressor, means for closing the inlet openings for atmospheric air of said first compressor and said second compressor, a releasable coupling permitting said second compressor to remain at rest when said power producing means is in operation and being capable of being engaged when said power producing means is in operation, and a second releasable coupling permitting said third compressor to remain at rest when said power producing means and said second compressor are in operation and being capable of being engaged when said power producing means is in operation.

17. In a gas turbine system, an axial flow gas turbine, means driven by said gas turbine and developing useful power, a compressor driven by said gas turbine and compressing air to be utilized as a constituent of the motive fluid for said gas turbine, said compressor being permanently driven by said gas turbine during the operation of the system and having a normal full load capacity for compressing a quantity of air appropriate to meet the requirements of the system at normal load, means for increasing the compressing capacity of the system to a value permitting forced operation of the system comprising a second compressor arranged to be driven by said gas turbine, and means comprising a releasable coupling permitting said second compressor to remain at rest when the system is operating at normal load and to be driven by said gas turbine to compress air for the system when the system is operating with a load higher than normal load.

18. In a gas turbine system, an axial flow gas turbine, means driven by said gas turbine and developing useful power, a first compressor permanently driven by said gas turbine and having an inlet opening for admission of air at substantially atmospheric pressure and an outlet for delivering air at elevated pressure to be utilized as a constituent of the motive fluid for said gas turbine, means for increasing the air compressing capacity of the system to a value permitting forced operation of the system comprising two additional compressors adapted to be driven by said gas turbine, and coupling means permitting at least one of said additional compressors to remain at rest when the system is operating at normal load and to be driven by said gas turbine to compress air for the system when the system is operating with a load higher than normal load.

19. In a gas system, an axial flow gas turbine, means driven by said gas turbine and developing useful power, a first compressor permanently driven by said gas turbine during the operation of the system and having an inlet opening for admission of air at substantially atmospheric pressure and an outlet for delivering air at elevated pressure to be utilized as a constituent of the motive fluid for said gas turbine, a second compressor adapted to be driven by said gas turbine and having an inlet for air at substantially atmospheric pressure, a conduit connecting the outlet of said second compressor with the inlet of said first compressor, a third compressor adapted to be driven by said gas turbine and having an inlet for air at substantially atmospheric pressure, a conduit connecting the outlet of said third compressor with the inlet of said second compressor, means for closing the inlet openings for atmospheric air of said first compressor and said second compressor, a releasable coupling permitting said second compressor to remain at rest when said gas turbine is in operation and being capable of being engaged when said gas turbine is in operation, and a second releasable coupling permitting said third compressor to remain at rest when said gas turbine and said second compressor are in operation and being capable of being engaged when said gas turbine is in operation.

ALF LYSHOLM.